US009234552B2

(12) United States Patent
Kimes

(10) Patent No.: US 9,234,552 B2
(45) Date of Patent: *Jan. 12, 2016

(54) MAGNETIC SYSTEM FOR CONTROLLING THE OPERATING MODE OF AN OVERRUNNING COUPLING ASSEMBLY AND OVERRUNNING COUPLING AND MAGNETIC CONTROL ASSEMBLY HAVING SAME

(71) Applicant: Means Industries, Inc., Saginaw, MI (US)

(72) Inventor: John W. Kimes, Wayne, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/288,819

(22) Filed: May 28, 2014

(65) Prior Publication Data

US 2014/0305761 A1 Oct. 16, 2014

Related U.S. Application Data

(63) Continuation-in-part of application No. 13/992,785, filed as application No. PCT/US2011/036634 on May 16, 2011.

(60) Provisional application No. 61/421,856, filed on Dec. 10, 2010, provisional application No. 61/941,741, filed on Feb. 19, 2014, provisional application No. 61/870,434, filed on Aug. 27, 2013.

(51) Int. Cl.
*F16D 27/09* (2006.01)
*F16D 41/00* (2006.01)

(52) U.S. Cl.
CPC ................ *F16D 27/09* (2013.01); *F16D 41/00* (2013.01)

(58) Field of Classification Search
CPC ....... F16D 27/02; F16D 27/108; F16D 27/14; F16D 27/01; F16D 41/08; B60K 17/06; B60K 17/08; B60K 1/02; B60K 1/00; B60K 6/00
See application file for complete search history.

(56) References Cited

U.S. PATENT DOCUMENTS 2,960,287 A 11/1960 Barlow
3,130,989 A 4/1964 Lannen
(Continued)

FOREIGN PATENT DOCUMENTS

GB 1007475 A 10/1965

OTHER PUBLICATIONS

International Search Report and Written opinion; International application No. PCT/US2014/041631; Date of mailing Oct. 9, 2014.
International Search Report and Written Opinion; International application No. PCT/US2011/036634; date of mailing Aug. 25, 2011.
International Preliminary Report on Patentability; International application No. PCT/US2011/036634; date of issuance of report Jun. 12, 2013.
(Continued)

*Primary Examiner* — David J Hlavka
(74) *Attorney, Agent, or Firm* — Brooks Kushman P.C.

(57) ABSTRACT

A magnetic system for controlling the operating mode of an overrunning coupling assembly is provided. The system includes a ferromagnetic or magnetic element received within a pocket in an uncoupling position and is movable outwardly from the pocket to a coupling position. The element controls the operating mode of the coupling assembly. An armature is connected to the element to move the element between the coupling and uncoupling positions. A magnetic field sensor is disposed adjacent and stationary with respect to the element for sensing magnetic flux to produce an output signal which is based on the position of the element. A variable magnetic field is generated in response to movement of the element between the coupling and uncoupling positions.

56 Claims, 3 Drawing Sheets

(56) References Cited

U.S. PATENT DOCUMENTS

| | | |
|---|---|---|
| 4,050,560 A | 9/1977 | Torstenfelt |
| 4,200,002 A | 4/1980 | Takahashi |
| 4,340,133 A | 7/1982 | Blersch |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,362,293 A | 11/1994 | Romanauskas |
| 5,387,854 A | 2/1995 | McCleer et al. |
| 5,394,321 A | 2/1995 | McCleer et al. |
| 5,449,057 A | 9/1995 | Frank |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,806,643 A | 9/1998 | Fitz |
| 5,847,469 A | 12/1998 | Tabata et al. |
| 5,856,709 A | 1/1999 | Ibaraki et al. |
| 5,871,071 A | 2/1999 | Sink |
| 5,918,715 A | 7/1999 | Ruth et al. |
| 5,927,455 A | 7/1999 | Baker et al. |
| 5,954,174 A | 9/1999 | Costin |
| 5,964,331 A | 10/1999 | Reed et al. |
| 5,979,627 A | 11/1999 | Ruth et al. |
| 5,996,758 A * | 12/1999 | Baxter, Jr. .................. 192/84.31 |
| 6,019,699 A | 2/2000 | Hoshiya et al. |
| 6,065,576 A | 5/2000 | Shaw et al. |
| 6,075,302 A | 6/2000 | McCleer |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,344,008 B1 | 2/2002 | Nagano et al. |
| 6,386,349 B1 | 5/2002 | Welch |
| 6,481,551 B1 | 11/2002 | Ruth |
| 6,503,167 B1 | 1/2003 | Sturm |
| 6,505,721 B1 | 1/2003 | Welch |
| 6,571,926 B2 | 6/2003 | Pawley |
| 6,814,201 B2 | 11/2004 | Thomas |
| 6,846,257 B2 | 1/2005 | Baker et al. |
| 6,854,577 B2 | 2/2005 | Ruth |
| 6,953,409 B2 | 10/2005 | Schmidt et al. |
| 6,982,502 B1 | 1/2006 | Sendaula et al. |
| 7,025,188 B2 | 4/2006 | Lindenschmidt et al. |
| 7,093,512 B2 | 8/2006 | Ibamoto et al. |
| 7,100,756 B2 | 9/2006 | Kimes et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,383,930 B2 | 6/2008 | Kimes et al. |
| 7,393,296 B2 | 7/2008 | Kano et al. |
| 7,397,296 B1 | 7/2008 | Kiani |
| 7,426,971 B2 | 9/2008 | Kano et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,661,518 B2 | 2/2010 | Kimes |
| 7,690,455 B2 | 4/2010 | Kano et al. |
| 7,690,492 B2 | 4/2010 | Gooden et al. |
| 7,806,795 B2 | 10/2010 | Oba et al. |
| 7,942,781 B2 | 5/2011 | Kimes |
| 8,007,396 B2 | 8/2011 | Kimes et al. |
| 8,051,959 B2 | 11/2011 | Eisengruber |
| 8,079,453 B2 | 12/2011 | Kimes |
| 8,187,141 B2 | 5/2012 | Goleski et al. |
| 8,196,724 B2 | 6/2012 | Samie et al. |
| 8,272,488 B2 | 9/2012 | Eisengruber et al. |
| 8,286,772 B2 | 10/2012 | Eisengruber |
| 8,324,890 B2 | 12/2012 | Lin |
| 8,418,825 B2 * | 4/2013 | Bird .................. 192/46 |
| 8,491,439 B2 | 7/2013 | Kimes |
| 8,491,440 B2 | 7/2013 | Kimes et al. |
| 8,720,659 B2 * | 5/2014 | Pawley .................. 192/46 |
| 2002/0000724 A1 | 1/2002 | Kalargeros et al. |
| 2004/0159517 A1 | 8/2004 | Thomas |
| 2006/0021838 A1 | 2/2006 | Kimes et al. |
| 2006/0138777 A1 | 6/2006 | Hofbauer et al. |
| 2006/0185957 A1 | 8/2006 | Kimes et al. |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0135369 A1 | 6/2008 | Meier |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0188338 A1 | 8/2008 | Kimes et al. |
| 2008/0223681 A1 | 9/2008 | Stevenson et al. |
| 2008/0245360 A1 | 10/2008 | Almy et al. |
| 2009/0062058 A1 | 3/2009 | Kimes et al. |
| 2009/0084653 A1 | 4/2009 | Holmes |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0233755 A1 | 9/2009 | Kimes |
| 2009/0255773 A1 | 10/2009 | Seufert et al. |
| 2010/0071497 A1 | 3/2010 | Reisch et al. |
| 2010/0105515 A1 | 4/2010 | Goleski et al. |
| 2010/0127693 A1 | 5/2010 | Wenzel et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2012/0021862 A1 | 1/2012 | Isken, II et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2013/0062151 A1 | 3/2013 | Pawley |
| 2014/0102844 A1 | 4/2014 | Greene et al. |
| 2014/0190785 A1 | 7/2014 | Fetting et al. |
| 2014/0284167 A1 | 9/2014 | Kimes |

OTHER PUBLICATIONS

International Search Report and Written Opinion; International application No. PCT/US12/050742; date of mailing Nov. 20, 2012.

Official Action, corresponding U.S. Appl. No. 13/992,785, filed Jun. 10, 2013.

Notice of Allowance and Issue Fee Due; corresponding U.S. Appl. No. 13/992,785; date of mailing Jan. 30, 2015.

International Search Report and Written Opinion; International application No. PCT/US2014/049044; date of mailing Nov. 24, 2014.

* cited by examiner

MAGNETIC SYSTEM FOR CONTROLLING THE OPERATING MODE OF AN OVERRUNNING COUPLING ASSEMBLY AND OVERRUNNING COUPLING AND MAGNETIC CONTROL ASSEMBLY HAVING SAME

CROSS-REFERENCE TO RELATED APPLICATIONS

This application claims the benefit of provisional patent application Ser. No. 61/941,741 filed Feb. 19, 2014 and Ser. No. 61/870,434 filed Aug. 27, 2013. This application is a continuation-in-part of U.S. patent application Ser. No. 13/992,785 filed Jun. 10, 2013 which is a 371 of PCT/US2011/036634 filed May 16, 2011 which, in turn, claims the benefit of provisional patent application Ser. No. 61/421,856 filed Dec. 10, 2010.

OVERVIEW

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission. U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 5,052,534; 5,070,978; 5,449,057; 5,678,668; 5,806,643; 5,871,071; 5,918,715; 5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,491,440; 8,491,439; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2013/0062151; 2012/0152683; 2012/0149518; 2012/0152687; 2012/0145505; 2011/0233026; 2010/0105515; 2010/0230226; 2009/0233755; 2009/0062058; 2008/0110715; 2008/0188338; 2008/0185253; 2006/0185957; and 2006/0021838.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMC) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing element) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

SUMMARY OF EXAMPLE EMBODIMENTS

An object of at least one embodiment of the present invention is to provide a magnetic control system for controlling the operating mode of an overrunning coupling assembly and an overrunning coupling and magnetic control assembly having such a system.

In carrying out the above object and other objects of at least one embodiment of the present invention, a magnetic system for controlling the operating mode of an overrunning coupling assembly is provided. The assembly includes a coupling member having a first coupling face and a coupling subassembly having a second coupling face with a pocket defining a load-bearing shoulder. The coupling faces are in close-spaced opposition with one another. At least one of the coupling member and the coupling subassembly is mounted for rotation about a rotary axis. The system includes a ferromagnetic or magnetic element received within the pocket in an uncoupling position and movable outwardly from the pocket to a coupling position characterized by abutting engagement of the element with the load-bearing shoulder. The element controls the operating mode of the coupling assembly. An electromagnetic source includes at least one excitation coil. A reciprocating armature is arranged concentrically relative to the at least one excitation coil and is axially movable when the at least one excitation coil is supplied with current. The armature is connected to the element to move the element between the coupling and uncoupling positions. A magnetic field sensor is disposed adjacent and stationary with respect to the element for sensing magnetic flux to produce an output signal which is based on the position of the element. A variable magnetic field is generated in response to movement of the element between the coupling and uncoupling positions.

The sensor may include a magnetic field sensing element.

The sensor may be back-biased wherein the element is a ferromagnetic element.

The element may be a locking element which controls the operating mode of the coupling assembly.

The locking element may be an injection molded strut.

The system may further include a return biasing member to urge the armature to a return position which corresponds to the uncoupling position of the element.

The coupling faces may be oriented to face axially.

The pocket may have a T-shape.

The element may include at least one projecting leg portion which provides an attachment location for a leading end of the armature.

Each leg portion may have an aperture, wherein the system may further include a pivot pin received within each aperture to allow rotational movement of the element in response to reciprocating movement of the armature and wherein the leading end of the armature may be connected to the element via the pivot pin.

Each aperture may be an oblong aperture to receive the pivot pin to allow both rotation and translational movement of the element in response to reciprocating movement of the armature.

The coupling assembly may be a clutch assembly and the coupling faces may be clutch faces.

Further in carrying out the above object and other objects of at least one embodiment of the present invention, an overrunning coupling and magnetic control assembly is provided. The assembly includes a coupling member having a first coupling face and a coupling subassembly having a second coupling face with a pocket defining a load-bearing shoulder. The coupling faces are in close-spaced opposition with one another. At least one of the coupling member and the coupling subassembly is mounted for rotation about a rotary axis. A ferromagnetic or magnetic element is received within the pocket in an uncoupling position and is movable outwardly from the pocket to a coupling position characterized by abutting engagement of the element with the load-bearing shoulder. The element controls the operating mode of the coupling assembly. An electromagnetic source includes at least one excitation coil. A reciprocating armature is arranged concentrically relative to the at least one excitation coil and is axially movable when the at least one excitation coil is supplied with current. The armature is connected to the element to move the element between the coupling and uncoupling positions. A magnetic field sensor is disposed adjacent and stationary with respect to the element for sensing magnetic flux to produce an output signal which is based on the position of the element. A variable magnetic field is generated in response to movement of the element between the coupling and uncoupling positions.

The sensor may include a magnetic field sensing element.

The sensor may be back-biased wherein the element is a ferromagnetic element.

The element may be a locking element such as an injection molded strut.

The assembly may further include a return biasing member to urge the armature to a return position which corresponds to the uncoupling position of the element.

The coupling faces may be oriented to face axially.

The pocket may have a T-shape.

The element may include at least one projecting leg portion which provides an attachment location for a leading end of the armature.

Each leg portion may have an aperture. The assembly may further include a pivot pin received within each aperture to allow rotational movement of the element in response to reciprocating movement of the armature. The leading end of the armature may be connected to the element via the pivot pin.

Each aperture may be an oblong aperture to receive the pivot pin to allow both rotation and translational movement of the element in response to reciprocating movement of the armature.

The coupling member may be a clutch member and the coupling faces may be clutch faces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
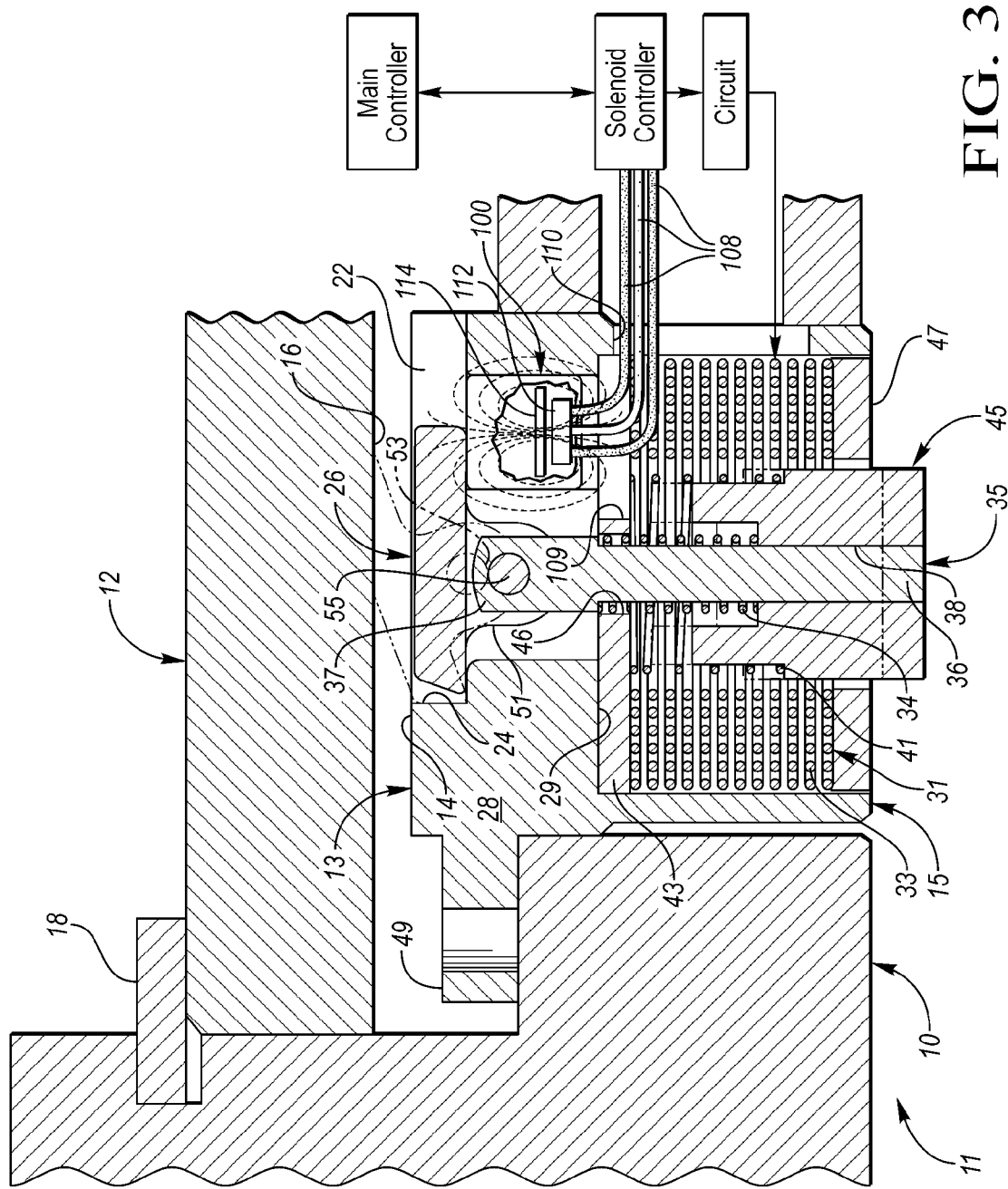
FIG. 3 is a view, partially broken away and in cross section, of an overrunning coupling and magnetic control assembly of at least one embodiment of the present invention utilizing the system.

Referring now to FIG. 3, there is illustrated a planar, controllable coupling assembly, generally indicated at 11. The assembly 11 includes a first coupling member, generally indicated at 10, a notch plate or member, generally indicated at 12, and an electromechanical apparatus, generally indicated at 15. The coupling assembly 11 may be a ratcheting, one-way clutch assembly. The second member 12 includes a second coupling face 16 in closed-spaced opposition with an outer coupling face 14 of a housing part 13 of the apparatus 15 when the members 10 and 12 are assembled and held together by a locking or snap ring 18. At least one of the members 10 and 12 is mounted for rotation about a common rotational axis.

Figure 2:
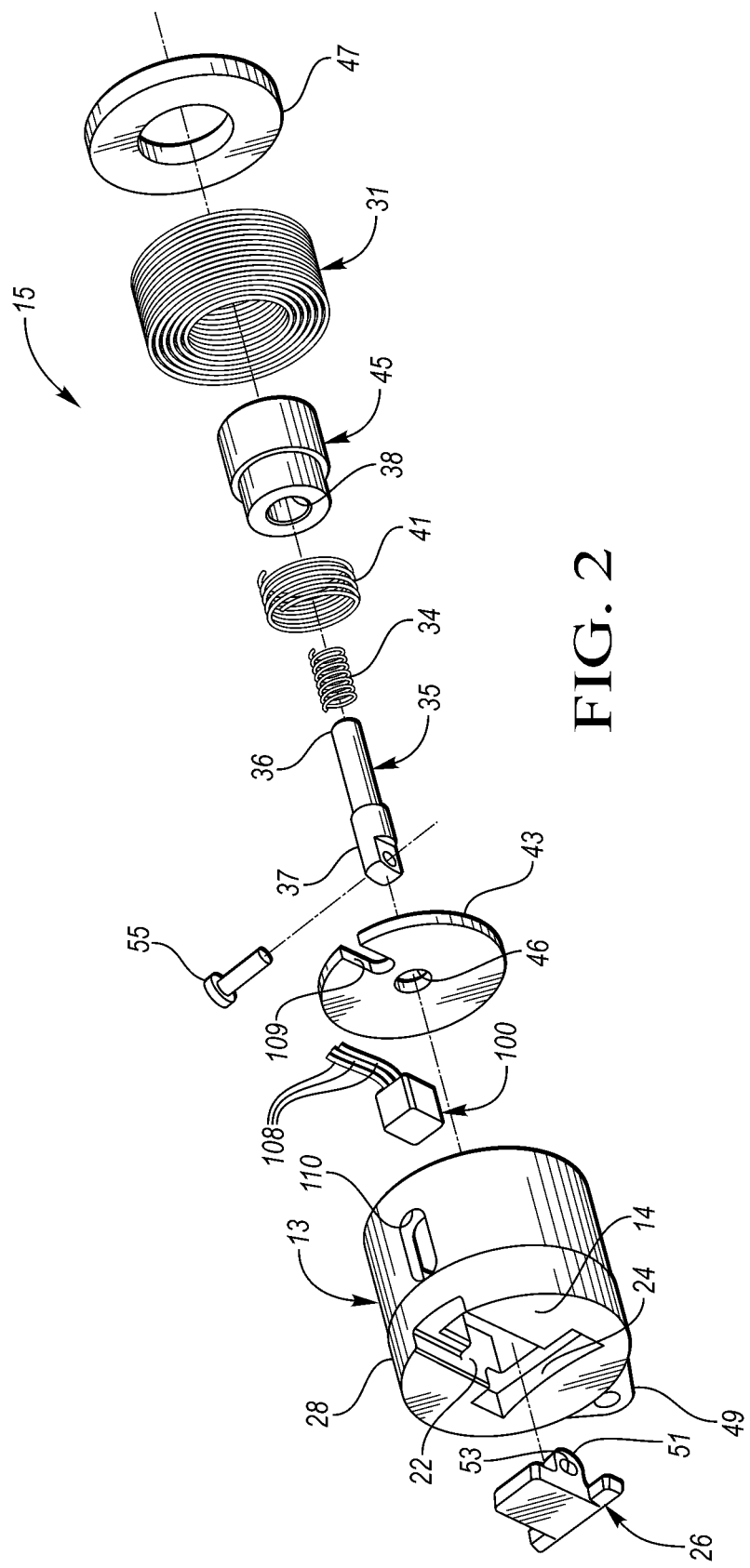
FIG. 2 is an exploded perspective view of the system taken from the top of the system.

The outer coupling face 14 of the housing part 13 has a single, T-shaped recess or pocket 22, as best shown in FIG. 2. The recess 22 defines a load-bearing first shoulder 24. The second coupling face 16 of the notch plate 12 has a plurality of recesses or notches (not shown but well known in the art). Each notch of the notches defines a load-bearing second shoulder.

Figure 1:
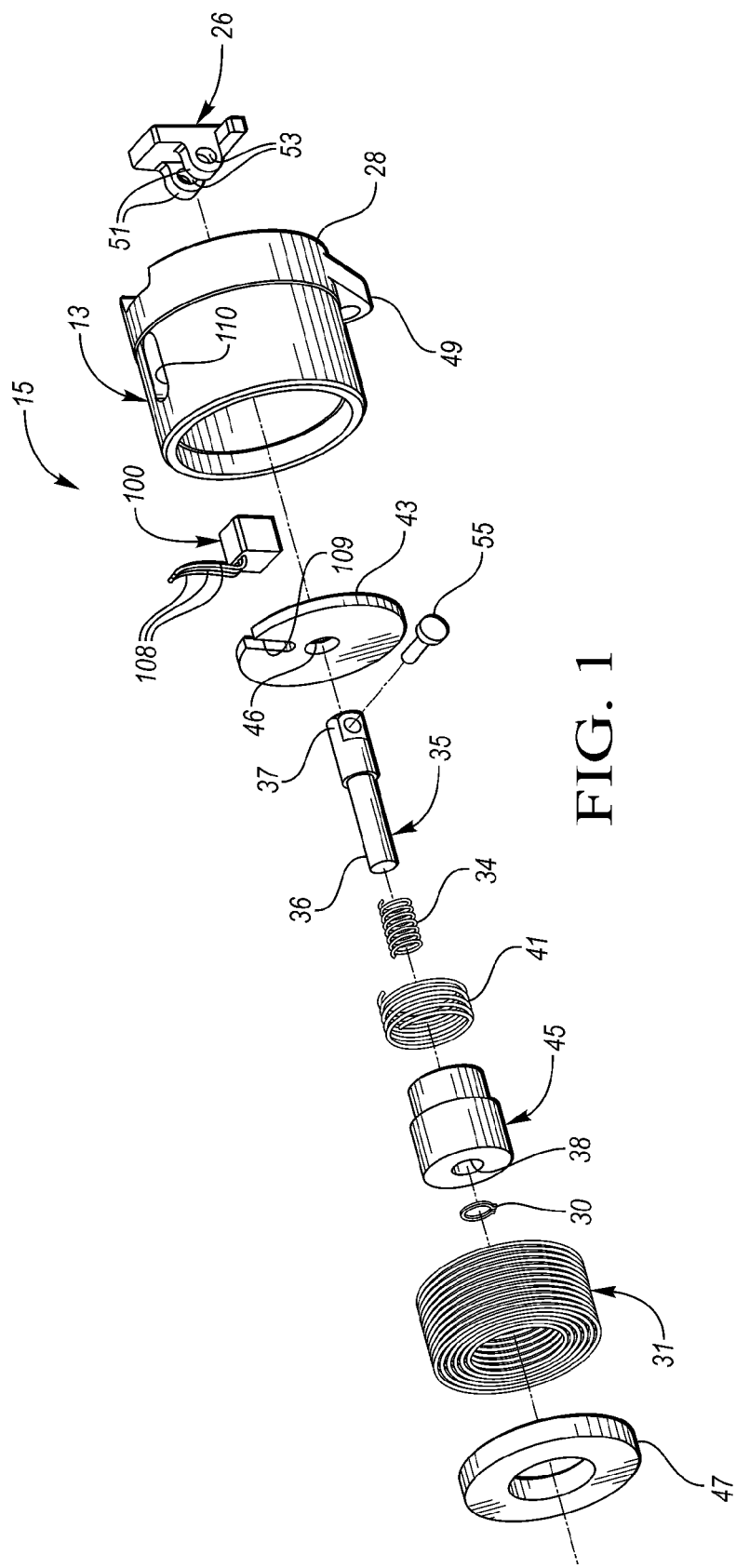
FIG. 1 is an exploded perspective view of a magnetic control system of at least one embodiment of the present invention taken from the bottom of the system.

Referring to FIGS. 1-3, the electromechanical apparatus 15 may include a locking strut or element, generally included at 26, disposed between the coupling faces 14 and 16 of the housing part 13 and the member 12, respectively, when the members 10 and 12 are assembled and held together.

The element 26 may comprise a ferromagnetic locking element or strut movable between first and second positions. The first position (phantom lines in FIG. 3) is characterized by abutting engagement of the locking element 26 with a load-bearing shoulder (not shown) of the member 12 and the shoulder 24 of the pocket 22 formed in an end wall 28 of the housing part 13. The second position (solid lines in FIG. 3) is characterized by non-abutting engagement of the locking element 26 with a load-bearing shoulder of at least one of the member 12 and the end wall 28.

The electromechanical apparatus 15 includes the housing part 13 which has a closed axial end including the end wall 28. The end wall 28 has the outer coupling face 14 with the single pocket 22 which defines the load-bearing shoulder 24 which is in communication with an inner face 29 of the end wall 28. The housing part 13 may be a metal (such as aluminum) injection molded (MIM) part.

The apparatus 15 also includes an electromagnetic source, generally indicated at 31, including at least one excitation coil 33 which is at least partially surrounded by a skirt of the housing part 13.

The element or strut 26 is shown as being received within the pocket 22 in its refracted, uncoupling position in FIG. 3. The strut 26 is movable outwardly from the pocket 22 to an extended, coupling position (phantom lines in FIG. 3) characterized by abutting engagement of the strut 26 with a load-bearing shoulder of the notch plate 12 and the shoulder 24.

The apparatus 15 also includes a reciprocating armature, generally indicated at 35, arranged concentrically relative to the at least one excitation coil 33 and is axially movable when the at least one excitation coil 33 is supplied with current. The coil 33 is wound about a tube 45 between plates 43 and 47. The plate 43 abuts against the surface 29. The armature 35 extends through a hole 46 formed through the plate 43 and is connected at its leading end 37 to the element 26 to move the element 26 between its coupling and uncoupling positions. The armature 35 also extends through an aperture 38 formed through the tube 45. The opposite end 36 of the armature 35 has a locking ring 30 (FIG. 1) which limits movement of the armature 35 in the aperture 38 towards the plate 12 by abutting against the lower surface of the tube 45 but allows the armature 35 to extend below the lower surface of the tube 45.

The element 26 is pivotally connected to the leading end 37 of the armature 35 wherein the armature 35 pivotally moves the element 26 within the pocket 22 in response to reciprocating movement of the armature 35.

The apparatus 15 also preferably includes a return spring 41, which extends between the plate 43 and a shoulder in the outer surface of the tube 45, to return the armature 35 and the tube 45 to their home position when the coil 33 is de-energized, thereby returning the element 26 to its uncoupling position. The apparatus also includes a spring 34 which urges the armature 35 to move the element 26 towards its coupling position. In other words, the biasing member, the spring 41, urges the armature 35 via the tube 45 to a return position which corresponds to its uncoupling position of the element 26 while the biasing member or spring 34 urges the armature 35 and connected element 26 to its coupled position and opposes any force in the opposite direction.

The housing part 13 and/or the plate 47 preferably has holes to allow oil to circulate within the housing part 13. Preferably, the at least one coil 33, the housing part 13, the tube 45 and the armature 35 comprise a low profile solenoid. The locking element 26 may be a metal (such as aluminum) injection molded (i.e. MIM) strut.

The housing part 13 has at least one apertured attachment flange 49 to attach the apparatus 15 to the coupling member 10 (corresponding aperture not shown) of the coupling assembly 11.

The element 26 includes at least one and, preferably, two projecting leg portions 51 which provide an attachment location for the leading end 37 of the armature 35. Each leg portion 51 has an aperture 53. The apparatus 15 further comprises a pivot pin 55 received within each aperture 53 to allow rotational movement of the element 26 in response to reciprocating movement of the armature 35 wherein the leading end 37 of the armature 35 is connected to the element 26 via the pivot pin 55.

Preferably, each aperture 53 is an oblong aperture which receives the pivot pin 55 to allow both rotation and translational movement of the element 26 in response to reciprocating movement of the armature 35. Each locking strut 26 may comprise any suitable rigid material such as ferrous metal, (i.e. steel).

FIGS. 1, 2 and 3 show a magnetic field sensor or device, generally indicated at 100. The device 100 may be a Hall-effect sensor which senses position of the strut 26. The strut 26 may carry or support a rare-earth, automotive grade, magnet or pellet (not shown) which may be embedded in a hole formed in the outer surface of the strut 26. In that case, the strut 26 is a non-ferrous strut such as an aluminum strut. Alternatively, and preferably, the strut 26 is a ferromagnetic strut.

The device 100 typically has three wires 108 (input, output and ground) and provides an industry standard, push-pull voltage output based on position of the strut 26 in the pocket 22. The device 100 accurately detects the position of the strut 26 with a single output (i.e., voltage output). The device 100 is preferably mounted adjacent to and below the pocket 22 and the wires 108 extend through an aperture 109 formed in the plate 43 and through an aperture 110 formed through the side wall or skirt of the housing part 13. The wires 108 are coupled to a solenoid controller (FIG. 3) which, in turn, is coupled to a main controller and to a coil drive circuit which supplies drive signals to the coil 33 in response to control signals from the solenoid controller. The device 100 may be held in place by fasteners or by an adhesive so that an upper surface of the device 100 is in close proximity to the bottom surface of the strut 26 in the uncoupling position of the strut 26.

The sensor 100 is typically back-biased when the strut 26 is ferromagnetic and typically includes a Hall sensor or sensing element mounted on a circuit board 114 on which other electronics or components are mounted, as is well-known in the art. The sensor 100 is preferably back-biased in that it includes a rare-earth magnet 112 which creates a magnetic flux or field which varies as the strut 26 moves. The sensor 100 may comprise a back-biased, Hall Effect device available from Allegro Microsystems.

In other words, the device 100 is preferably a back-biased device wherein the device includes a rare earth pellet or magnet whose magnetic field varies as the strut 26 moves towards and away from its uncoupled position. The variable magnetic field is sensed by the magnetic sensing element of the device 100.

The output signal from the device 100 is a feedback signal which is received by the solenoid controller which, in turn, provides a control signal to the circuit which, in turn, provides drive control signals to control current flow to the coil 73. By providing feedback, the resulting closed-loop control system has improved sensitivity, accuracy and repeatability.

The electromechanical apparatus 15 of the exemplary clutch assembly 11 may be carried by a driving member of the clutch assembly 11 or a driven member of the assembly 11. Moreover, the strut 26 of the exemplary clutches assemblies may have any suitable configuration depending on whether the assembly is a planar coupling assembly as shown herein or a rocker coupling assembly (not shown). Also, each strut or rocker (in a radial coupling assembly) may have a middle portion that is thicker than each end portion of the strut or rocker.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A magnetic system for controlling the operating mode of an overrunning coupling assembly including a coupling member having a first coupling face and a coupling subassembly having a second coupling face with a pocket defining a load-bearing shoulder, the coupling faces being in close-spaced opposition with one another, at least one of the coupling member and the coupling subassembly being mounted for rotation about a rotary axis, the system comprising:
    a ferromagnetic or magnetic element received within the pocket in an uncoupling position and movable outwardly from the pocket to a coupling position characterized by abutting engagement of the element with the load-bearing shoulder; the element controlling the operating mode of the coupling assembly;
    an electromagnetic source including at least one excitation coil;
    a reciprocating armature arranged concentrically relative to the at least one excitation coil and being axially movable when the at least one excitation coil is supplied with current, the armature being connected to the element to move the element between the coupling and uncoupling positions; and
    a magnetic field sensor disposed adjacent and stationary with respect to the element for sensing magnetic flux to produce an output signal which is based on the position of the element wherein a variable magnetic field is generated in response to movement of the element between the coupling and uncoupling positions.

2. The system as claimed in claim 1, wherein the sensor includes a magnetic field sensing element.

3. The system as claimed in claim 1, wherein the sensor is back-biased and wherein the element is a ferromagnetic element.

4. The system as claimed in claim 1, wherein the element is a locking element which controls the operating mode of the coupling assembly.

5. The system as claimed in claim 4, wherein the locking element is an injection molded strut.

6. The system as claimed in claim 1, further comprising a return biasing member to urge the armature to a return position which corresponds to the uncoupling position of the element.

7. The system as claimed in claim 1, wherein the coupling faces are oriented to face axially.

8. The system as claimed in claim 1, wherein the pocket has a T-shape.

9. The system as claimed in claim 1, wherein the element includes at least one projecting leg portion which provides an attachment location for a leading end of the armature.

10. The system as claimed in claim 9, wherein each leg portion has an aperture, wherein the system further comprises a pivot pin received within each aperture to allow rotational movement of the element in response to reciprocating movement of the armature and wherein the leading end of the armature is connected to the element via the pivot pin.

11. The system as claimed in claim 10, wherein each aperture is an oblong aperture to receive the pivot pin to allow both rotation and translational movement of the element in response to reciprocating movement of the armature.

12. The system as claimed in claim 1, wherein the coupling assembly is a clutch assembly and the coupling faces are clutch faces.

13. An overrunning coupling and magnetic control assembly comprising:
    a coupling member having a first coupling face and a coupling subassembly having a second coupling face with a pocket defining a load-bearing shoulder, the coupling faces being in close-spaced opposition with one another, at least one of the coupling member and the coupling subassembly being mounted for rotation about a rotary axis;
    a ferromagnetic or magnetic element received within the pocket in an uncoupling position and movable outwardly from the pocket to a coupling position characterized by abutting engagement of the element with the load-bearing shoulder; the element controlling the operating mode of the coupling assembly;
    an electromagnetic source including at least one excitation coil;
    a reciprocating armature arranged concentrically relative to the at least one excitation coil and being axially movable when the at least one excitation coil is supplied with current, the armature being connected to the element to move the element between the coupling and uncoupling positions; and
    a magnetic field sensor disposed adjacent and stationary with respect to the element for sensing magnetic flux to produce an output signal which is based on the position of the element wherein a variable magnetic field is generated in response to movement of the element between the coupling and uncoupling positions.

14. The assembly as claimed in claim 13, wherein the sensor includes a magnetic field sensing element.

15. The assembly as claimed in claim 13, wherein the sensor is back-biased and wherein the element is a ferromagnetic element.

16. The assembly as claimed in claim 13, wherein the element is a locking element.

17. The assembly as claimed in claim 16, wherein the locking element is an injection molded strut.

18. The assembly as claimed in claim 13, further comprising a return biasing member to urge the armature to a return position which corresponds to the uncoupling position of the element.

19. The assembly as claimed in claim 13, wherein the coupling faces are oriented to face axially.

20. The assembly as claimed in claim 13, wherein the pocket has a T-shape.

21. The assembly as claimed in claim 13, wherein the element includes at least one projecting leg portion which provides an attachment location for a leading end of the armature.

22. The assembly as claimed in claim 21, wherein each leg portion has an aperture, wherein the assembly further comprises a pivot pin received within each aperture to allow rotational movement of the element in response to reciprocating movement of the armature and wherein the leading end of the armature is connected to the element via the pivot pin.

23. The assembly as claimed in claim 22, wherein each aperture is an oblong aperture to receive the pivot pin to allow both rotation and translational movement of the element in response to reciprocating movement of the armature.

24. The assembly as claimed in claim 13, wherein the coupling member is a clutch member and the coupling faces are clutch faces.

25. An electromechanical apparatus for use in a controllable coupling assembly, the apparatus comprising:
a housing part having a closed axial end including an end wall having an outer coupling face with a single pocket defining a load-bearing shoulder in communication with an inner face of the end wall;
an electromagnetic source including at least one excitation coil at least partially surrounded by the housing part;
an element received within the pocket in an uncoupling position and movable outwardly from the pocket to a coupling position characterized by abutting engagement of the element with the load-bearing shoulder; and
a spring-loaded reciprocating armature arranged concentrically relative to the at least one excitation coil and being axially movable when the at least one excitation coil is supplied with current, the armature being connected to the element to move the element between the coupling and uncoupling positions.

26. The apparatus as claimed in claim 25, wherein the element is a locking element which controls the operating mode of the coupling assembly.

27. The apparatus as claimed in claim 25, wherein the element is an impact energy storage element to absorb and store impact energy to reduce undesirable noise and contact stress caused by a transition between operating modes of the coupling assembly.

28. The apparatus as claimed in claim 25, wherein the element is pivotally connected to a leading end of the armature and wherein the armature pivotally moves the element within the pocket in response to reciprocating movement of the armature.

29. The apparatus as claimed in claim 25, wherein the at least one coil, the housing part and the armature comprise a low profile solenoid.

30. The apparatus as claimed in claim 26, wherein the locking element is an injection molded strut.

31. The apparatus as claimed in claim 27, wherein the storage element includes a rigid insert and an elastomeric outer covering layer surrounding and bonded to the insert.

32. The apparatus as claimed in claim 31, wherein the outer covering layer is a high temperature-resistant layer molded over the insert.

33. The apparatus as claimed in claim 27, wherein the storage element carries elastomeric material defining opposite end sections of the storage element, one of the end sections being configured to deflect upon abutting engagement with the shoulder.

34. The apparatus as claimed in claim 25, further comprising a biasing member to urge the armature to a position which corresponds to the coupling position of the element.

35. The apparatus as claimed in claim 25, wherein the housing part has at least one attachment flange to attach the apparatus to a coupling member of the coupling assembly.

36. The apparatus as claimed in claim 25, wherein the outer coupling face of the end wall is oriented to face axially.

37. The apparatus as claimed in claim 25, wherein the pocket has a T-shape.

38. The apparatus as claimed in claim 25, wherein the element includes at least one projecting leg portion which provides an attachment location for a leading end of the armature.

39. The apparatus as claimed in claim 28, wherein each leg portion has an aperture and wherein the apparatus further comprises a pivot pin received within each aperture to allow rotational movement of the element in response to reciprocating movement of the armature and wherein the leading end of the armature is connected to the element via the pivot pin.

40. The apparatus as claimed in claim 39, wherein each aperture is an oblong aperture to receive the pivot pin to allow both rotation and translational movement of the element in response to reciprocating movement of the armature.

41. A controllable coupling assembly having multiple operating modes, the assembly comprising:
first and second coupling members supported for rotation relative to one another about a common rotational axis, the first coupling member having a first coupling face with a plurality of recesses, each of the recesses defining a load-bearing first shoulder; and
an electromechanical apparatus including:
a housing part having a closed axial end including an end wall having an outer coupling face in close-spaced opposition to the first coupling face and having a single pocket defining a load-bearing second shoulder in communication with an inner face of the end wall;
an electromagnetic source including at least one excitation coil at least partially surrounded by the housing part;
an element received within the pocket in an uncoupling position and movable outwardly from the pocket to a coupling position characterized by abutting engagement of the element with respective shoulders of the first member and the end wall; and
a spring-loaded reciprocating armature arranged concentrically relative to the at least one excitation coil and being axially movable when the at least one excitation coil is supplied with current, the armature being connected to the element to move the element between the coupling and uncoupling positions.

42. The assembly as claimed in claim 41, wherein the element is a locking element.

43. The assembly as claimed in claim 41, wherein the element is an impact energy storage element to absorb and store impact energy.

44. The assembly as claimed in claim 41, wherein the element is pivotally connected to a leading end of the armature and wherein the armature pivotally moves the element within the pocket in response to reciprocating movement of the armature.

45. The assembly as claimed in claim 42, wherein the locking element is an injection molded strut.

46. The assembly as claimed in claim 43, wherein the storage element includes a rigid insert and an elastomeric outer covering layer surrounding and bonded to the insert.

47. The assembly as claimed in claim 46, wherein the outer covering layer is a high temperature-resistant layer molded over the insert.

48. The assembly as claimed in claim 43, wherein the storage element carries elastomeric material defining opposite end sections of the storage element, each end section being configured to deflect upon abutting engagement with respective shoulders of the first coupling member and the end wall.

49. The assembly as claimed in claim 41, wherein the at least one coil, the housing part and the armature comprise a low profile solenoid.

50. The assembly as claimed in claim 41, further comprising a biasing member to urge the armature to a position which corresponds to the coupling position of the element.

51. The assembly as claimed in claim 41, wherein the housing part has at least one attachment flange to attach the apparatus to the second coupling member.

52. The assembly as claimed in claim 41, wherein the outer coupling face of the end wall is oriented to face axially.

53. The assembly as claimed in claim 41, wherein the pocket has a T-shape.

54. The assembly as claimed in claim 41, wherein the element includes at least one projecting leg portion which provides an attachment location for a leading end of the armature.

55. The assembly as claimed in claim 54, wherein each leg portion has an aperture and wherein the apparatus further includes a pivot pin received within each aperture to allow rotational movement of the element in the pocket in response to reciprocating movement of the armature and wherein the leading end of the armature is connected to the element via the pivot pin.

56. The assembly as claimed in claim 55, wherein each aperture is an oblong aperture to receive the pivot pin to allow both rotation and translational movement of the element in response to reciprocating movement of the armature.

* * * * *